US011450215B2

(12) United States Patent
Adolf et al.

(10) Patent No.: US 11,450,215 B2
(45) Date of Patent: Sep. 20, 2022

(54) MOTION PLANNING METHOD AND SYSTEM FOR AIRCRAFT, IN PARTICULAR FOR LOAD-CARRYING AND/OR PEOPLE-CARRYING VTOL AIRCRAFT

(71) Applicant: Volocopter GmbH, Bruchsal (DE)

(72) Inventors: Florian-Michael Adolf, Frankfurt am Main (DE); Markus Ortlieb, Straubenhardt (DE)

(73) Assignee: Volocopter GmbH, Bruchsal (DE)

( * ) Notice: Subject to any disclaimer, the term of this patent is extended or adjusted under 35 U.S.C. 154(b) by 680 days.

(21) Appl. No.: 16/785,146

(22) Filed: Feb. 7, 2020

(65) Prior Publication Data
US 2020/0327814 A1     Oct. 15, 2020

(30) Foreign Application Priority Data

Feb. 8, 2019   (DE) ..................... 10 2019 103 173.7

(51) Int. Cl.
*G08G 5/00*     (2006.01)
*B64C 29/00*    (2006.01)
(Continued)

(52) U.S. Cl.
CPC ....... *G08G 5/0039* (2013.01); *B64C 29/0025* (2013.01); *B64D 27/24* (2013.01); *G05D 1/102* (2013.01)

(58) Field of Classification Search
CPC .. G08G 5/0039; G08G 5/006; B64C 29/0025; B64D 27/24; G05D 1/102
(Continued)

(56) References Cited

U.S. PATENT DOCUMENTS 6,334,344 B1    1/2002  Bonhoure et al.
8,332,083 B1 *  12/2012 McCusker ........... G05D 1/0676
                                                  701/4
(Continued)

FOREIGN PATENT DOCUMENTS

DE    43 13 403 A1    10/1993
GB    2 266 286 A     10/1993

*Primary Examiner* — Isaac G Smith
(74) *Attorney, Agent, or Firm* — Volpe Koenig

(57) ABSTRACT

A motion planning method and system for aircraft, in particular for separately electrically driven, load-carrying and/or people-carrying multicopters, includes: a motion preliminary planning unit that executes a preliminary planning algorithm using a computer on the ground or on board an aircraft in question, by which algorithm a reference trajectory, emergency trajectories are determined at intervals along the reference trajectory and confidence intervals are determined along the reference trajectory, which confidence intervals specify a spatial volume in which to maneuver without a pre-planned path but that the aircraft can't leave or is able to leave only at predefined locations; a data store in which parameters of the reference trajectory, parameters of the confidence intervals and parameters regarding a permissible deviation of the aircraft from the reference trajectory are stored on the aircraft according to instructions of the motion preliminary planning unit; a real-time control unit on the aircraft for the real-time motion planning using the parameters and the confidence intervals and using system data of the aircraft recorded by sensors; and an actuation apparatus that actuates flight control/regulation apparatuses of the aircraft using control/regulation signals derived from the real-time motion planning, wherein the flight control/regulation apparatuses of the aircraft are actuatable such that the aircraft is moved or is able to be moved either a) along the reference trajectory or b) along a real-time trajectory within a confidence interval or along an emergency trajec- (Continued)

tory with a given or required deviation from the reference trajectory.

26 Claims, 5 Drawing Sheets

(51) Int. Cl.
*B64D 27/24* (2006.01)
*G05D 1/10* (2006.01)

(58) Field of Classification Search
USPC .............................................. 701/3
See application file for complete search history.

(56) References Cited

U.S. PATENT DOCUMENTS

2014/0343765 A1 11/2014 Suiter et al.
2018/0357693 A1* 12/2018 Balasubramanian .. G05D 1/104

* cited by examiner

MOTION PLANNING METHOD AND SYSTEM FOR AIRCRAFT, IN PARTICULAR FOR LOAD-CARRYING AND/OR PEOPLE-CARRYING VTOL AIRCRAFT

INCORPORATION BY REFERENCE

The following documents are incorporated herein by reference as if fully set forth: German Patent Application No. 10 2019 103 173.7, filed Feb. 8, 2019.

TECHNICAL FIELD

The invention relates to a motion planning method for aircraft, in particular for (separately electrically driven, load-carrying and/or people-carrying) vertical take-off and landing (VTOL) aircraft (multicopters).

The invention also relates to a motion planning system for aircraft, in particular for (electrically driven) load-carrying and/or people-carrying VTOL aircraft.

The invention relates lastly to an aircraft, in particular a (separately electrically driven, vertical take-off and landing) load-carrying and/or people-carrying VTOL aircraft.

BACKGROUND

Due to the increase in population and urban development, there is nowadays a need for aircraft, in particular electrically driven, vertical take-off and landing, load-carrying and/or people-carrying aircraft, which should be able to be used as future transport means, especially in urban environments, and should be able to be controlled by untrained users, even without pilot training. Even completely autonomous flight by way of such aircraft should preferably be possible. For this purpose, there is a need for comprehensive motion planning and for a corresponding motion planner in order to completely avoid problems or even accidents where possible during operational flight.

Studies have already been performed in the past for respective partial aspects of such a motion planner. Planning environments for the creation of comprehensively pre-planned, map-based missions in the military field have thus already been developed and approved (NASA). In this case, safety was ensured by virtue of emergency landing trajectories that were pre-planned at regular route intervals and that were able to be selected in real time during flight by a state machine. What are known as GCAS (ground collision avoidance system) systems have already likewise been developed in the 1990s based on maps, these automatically preventing collisions with the terrain through targeted maneuvers (NASA, Airbus).

Complete mission preliminary planning ("mission" is used here and hereinafter synonymously with the term "flight") has the disadvantage that the decision capability during flight is greatly restricted to the scenarios taken into consideration or able to be predicted before the flight. In an environment affected by uncertainty, such as an unpredictable urban environment containing a multiplicity of (mobile) obstacles, this requires complex preliminary planning in order also to be able to predict and take into consideration improbable events before they occur. In the case of a direct, unconsidered implementation, this is accompanied by an expenditure in terms of computation and memory that is no longer able to be handled on a practical level.

In contrast to pure preliminary planning in which all of the possible flight states that the aircraft is able to adopt during the mission have to be known beforehand, (real-time) planning algorithms that are executed on the flight platform (the aircraft) itself offer considerably more restricted transparency properties, which makes it difficult for the supervisory authorities to perform the required examination and certification. The computational requirement may furthermore be significantly questionable, according to the ability to execute under real-time conditions. Said (real-time) planning algorithms are often optimization-based or sampling-based approaches that do not exhibit deterministic behaviour that is known unambiguously in advance. This represents an obstacle, in particular when certifying the planning environment for people-carrying aircraft. The relevant authorities are in principle interested in ensuring that it is able to be established, at all times in a repeatable and deterministic manner, (exactly) where the aircraft is located during the trajectory planning and during the flight.

The prior art thus contains clear deficits with regard to control and planning methods in order to ensure comprehensive, real-time-capable aviation navigation and deterministic decision-making on-board with simultaneously high safety requirements (operational safety) and low resource consumption during the flight (computational efficiency).

SUMMARY

The invention is based on the object of providing a remedy in this respect and of specifying both a method and a system of the type defined at the outset that offers real-time executability with low computational and storage expenditure with increased transparency for the purpose of examination and certification by the supervisory authorities, and which is able to be used for autonomous, civil aviation navigation in complex environments with high safety requirements.

This object is achieved by a method having one or more features of the invention, by a system having one or more features of invention, and by an aircraft having one or more features of the invention. Developments of the concept according to the invention are defined below and in the claims.

A motion planning method according to the invention for aircraft, in particular for VTOL aircraft, for example separately electrically driven, load-carrying and/or people-carrying multicopters, comprises: motion preliminary planning by way of a computer on the ground or on board an aircraft in question involving determining a reference trajectory, preliminary planning of emergency trajectories, in particular emergency landing trajectories, at preferably regular intervals along the reference trajectory (intended flight path) and specifying or defining what are known as confidence intervals (expected, permissible deviations) along the reference trajectory, which confidence intervals in each case represent a spatial volume in which the aircraft is able to maneuver without a pre-planned path but that the aircraft is not able to leave or is able to leave only at predefined locations; storing parameters of the reference trajectory and parameters with regard to a permissible deviation of the aircraft from the reference trajectory and the confidence intervals (or corresponding parameters) in a database on board the aircraft; real-time motion planning on board the aircraft using said parameters and environment and system data of the aircraft recorded by sensors or provided externally, from which environment and system data it is possible to derive a system state of the aircraft (for example through estimation or prediction on the basis of a model); and actuating flight control/regulation apparatuses of the aircraft by way of control/regulation signals derived from the real-time motion planning. In the method, flight control/regulation apparatuses of the aircraft are actuated such that the aircraft is moved either a) along the reference trajectory or b) along a trajectory, recalculated in real time, within a confidence interval or along an emergency trajectory with a given deviation (for example due to the influence of wind) or a required deviation (for example due to the occurrence of an obstacle) from the reference trajectory.

Such a motion planning method bridges the gap between deterministic planning behaviour, real-time executability of the planning algorithm and the required ability to predict the trajectory tracking performance under defined operating conditions (for example weather and flight distance), reduces the required computational and memory expenditure and affords increased transparency for the aircraft operator for the purpose of inspection and verification management with the supervisory authorities. One important aspect in this connection is the provision of said confidence intervals along the reference trajectory, these in each case being a spatial volume in which the aircraft is in principle able to maneuver freely within the volume without an exactly pre-planned path, because there is no (known) hazard potential, but that the aircraft is not able to leave or is able to leave only at predefined locations, such that the required ability to locate the aircraft is ensured.

A motion planning system according to the invention for aircraft, in particular for electrically driven, load-carrying and/or people-carrying multicopters, comprises: a motion preliminary planning unit that is designed and intended to execute a preliminary planning algorithm by way of a computer on the ground or on board an aircraft in question, by way of which algorithm a reference trajectory, emergency trajectories, in particular emergency landing trajectories, are able to be determined at preferably regular intervals along the reference trajectory and confidence intervals are able to be determined along the reference trajectory, which confidence intervals in each case specify a spatial volume in which the aircraft is able to maneuver without a pre-planned path but that the aircraft is not able to leave or is able to leave only at predefined locations; a storage unit in which parameters of the reference trajectory, parameters of the confidence intervals and parameters regarding a permissible deviation of the aircraft from the reference trajectory are stored or are able to be stored in a database on board the aircraft according to the instructions of the motion preliminary planning unit; a real-time control unit on board the aircraft that is designed and intended for real-time motion planning of the aircraft using said parameters and the confidence intervals and using an amount of environment and system data of the aircraft recorded by sensors or provided externally; and an actuation apparatus that is designed and intended to actuate flight control/regulation apparatuses of the aircraft by way of control/regulation signals derived from the real-time motion planning, wherein the flight control/regulation apparatuses of the aircraft are actuated or are able to be actuated such that the aircraft is moved or is able to be moved either a) along the reference trajectory or b) along a real-time trajectory within a confidence interval or along an emergency trajectory with a given or required deviation (see above) from the reference trajectory.

An aircraft according to the invention, in particular VTOL aircraft, preferably in the form of a separately electrically driven, vertical take-off and landing, load-carrying and/or people-carrying multicopter, comprises at least the components or features, located on board the aircraft, of the system according to the invention, in particular: the (optional) motion preliminary planning unit; the storage unit with the database; the real-time control unit, the actuation apparatus; and a system monitor that is designed and intended to record and to provide available data about the aircraft.

One preferred development of the method according to the invention includes the fact that the motion preliminary planning is performed before a flight or a mission in order to obtain a preliminary planning result that comprises the reference trajectory (or nominal trajectory) and the emergency trajectories. This involves analyzing a set of reachable states that may be given by (maximum) deviations from the reference trajectory, and specifying strict prioritization protocols in order to achieve real-time executability with quasi-deterministic behaviour on a computer, either a ground-assisted computer or a computer on board the aircraft. Said deviations result for example from measurement inaccuracies and/or regulator/controller deviations on board the aircraft. The preliminary planning result and possibly the prioritization protocols (if these are not yet present) are then stored in the database on board the aircraft. A state machine on board the aircraft determines, on the basis of a current environment and system state that is determined on the basis of sensor data from sensors located on board the aircraft and on the basis of external data, such as for example UTM/ATM data, weather data, etc. or data from communication with other, preferably identical aircraft, a path planning mode that is permissible at a given time during the flight, by way of which path planning mode, at all times, either the flight (the mission) is able to be completed by reaching a destination of the aircraft or it is able to be safely ended early, in particular through a safe emergency landing or by reaching an alternative destination. The motion planning is performed in real time automatically during the flight by the computer on board the aircraft in accordance with the determined path planning mode, taking into consideration the set of reachable states (reachability set) with strict prioritization of predefined types of maneuver on the basis of the prioritization protocols, while complying with the defined confidence intervals and predefined flight levels, and a result of this real-time motion planning is used by the controller for real-time flight control of the aircraft.

The calculation is preferably performed for each type of aircraft and for each mission, since external interferences may change depending on the mission profile (for example wind, air density, etc.). If the same type of aircraft repeatedly flies the same mission, that is to say, with (virtually) identical external interferences, recalculation may be dispensed with.

The reachability set may for example be taken into consideration by determining which positions in space the aircraft in question could theoretically reach due to interfering influences (drift etc.) or lack of resolution of setting means that are used (for motor rotational speeds, tail unit settings or the like) in spite of nominal movement along the reference trajectory. In order to display this set, a discrete representation in the form of one reachability set per trajectory (envelope of possible flight routes) may be provided, taking into consideration different performance states of the aircraft (for example nominal state, failure scenarios, environmental conditions). As an alternative or in addition, it is possible to provide or to surround the aircraft and/or known obstacles with an "envelope", that is to say an inaccessible buffer region, for planning purposes.

Specifically, the method according to the invention may adopt the following form in one appropriate refinement:

1. A nominal flight route is determined on the basis of 3D map data with overlaid additional information, such as for example no-fly zones, weather data, hazard potential maps (meaning that regions in the map are occupied with different potentials—unfavourable regions have a higher potential, favourable regions have a lower potential), emergency landing sites, etc.
2. A nominal trajectory (the reference trajectory) is calculated on the basis of this nominal flight route.
3. Following this, emergency trajectories to the in each case most favourable emergency landing sites are calculated at fixed distances.
4. Confidence intervals are assigned along the nominal trajectory on the basis of the data from points 1.-3. These confidence intervals may be superimposed, meaning that confidence intervals may be overlaid with various functions (for example evasions, holding patterns, etc.).
5. Using this data material, the authorities may be requested to approve the flight, which may still result in changes to the planned trajectory (for example individual (emergency) trajectories may need to be discarded).
6. The data approved by the authorities are then stored on the aircraft and are available for the real-time planning.

Abovementioned points 2. and 3. include the fact that analysis of the reachability set (to be understood as the maximum path tracking error/deviation) is performed specifically for each combination of a type of aircraft and the mission to be planned, as already mentioned above. This analysis or the result thereof is incorporated jointly into the calculations of the nominal trajectories.

This reachability set should be distinguished from what is known as a flight envelope: It describes the operating limits of a respective type of aircraft in terms of flight mechanics. Depending on the path planning mode that is selected (for example a normal passenger flight from point A to B), only a partial region of the flight envelope is approved (for example because passengers are not normally allowed to experience acceleration of more than 1.2 g), whereas for example, in an emergency mode, the maximum performance of the aircraft (up to the edge of the flight envelope) is approved by the autopilot.

By virtue of this novel combination of preliminary planning, taking into consideration the reachability set, the confidence intervals and strict prioritization protocols, real-time executability with quasi-deterministic behaviour is achieved. A state machine (in particular in the form of an algorithm or switching logic) on board the aircraft (preferably in the form of an embedded computer), on the basis of the current system state that is determined by a system monitor based on internal and external environment and system data (in relation to the aircraft), determines the respectively permissible path planning mode on the basis of criteria, such as safety or efficiency, by way of which path planning mode, at all times, the mission either is able to be completed or is able to be safely ended early. This is also referred to as "fail-operational" (reaching the destination) or "failsafe" (safe emergency landing or reaching an alternative destination).

The planning takes place with strict maneuver prioritization on the basis of the prioritization protocols, according to which for example en-route maneuvers (that is to say maneuvers on a pre-planned flight route, for example braking, see below) are performed ahead of vertical maneuvers (climbing, descending) and ahead of horizontal maneuvers (lateral deviation), in which the flight route is left upwardly/ downwardly or to the left/to the right. Climbing may likewise be given a higher priority than descending. The defined confidence intervals and possibly predefined flight levels (flight altitudes) are in this case complied with. In a manner similar to a completely pre-planned mission, the path planning described here makes it possible to precisely predict unreachable locations and states. In one corresponding refinement, the method calculates both a combination of individual flight paths and closed sets for the online planning of permissible paths, which may be a (preferably conservatively estimated, that is to say estimated with a safety buffer) combined set of all of the permissible flight paths.

In one development of the method according to the invention, there is accordingly provision for both a combination of individual flight paths and at least one closed set of flight paths permissible for the aircraft, preferably a conservatively estimated combined set of all of the flight paths permissible for the aircraft, to be determined as a result of the analysis of the set of reachable states. This combined set of all of the permissible flight paths may preferably comprise all of the confidence intervals and the pre-planned reference and emergency trajectories.

A difficult planning problem is thereby able to be solved on embedded computers in real time, in spite of tight limits (for example spatial extent, restricted flying power).

This is preferably made possible by quasi-deterministic preliminary planning via quasi-discrete states in connection with strict prioritization and limitation of the number of flying maneuvers taken into consideration. In one development of the method according to the invention, there is accordingly provision for a number of flying maneuvers taken into consideration during the real-time flight control to be limited, in particular through a restriction to maneuver libraries that comprise a finite number of possible flight paths or flight path sections for path planning, which maneuver libraries are kept in a database on board the aircraft, wherein the maneuver library preferably comprises predefined control/regulation signals for flight control/regulation apparatuses of the aircraft, for example in the form of lookup tables, and is most preferably stored in the database in such a way as to optimize memory by using symmetries and superimposition.

The use of maneuver libraries should be understood here as just one option of many. What is important is that real-time planning is able to be performed within the limits of predefined intervals taking into account the reachability set.

During the flight, this results in increased planning flexibility in comparison with pure fixed preliminary planning, which in turn allows reactive planning components to be integrated (for example collision avoidance or complying with a sufficient distance from other air traffic—separation). The complexity of the preliminary planning and the storage complexity of the planning solution to be retained on the aircraft is furthermore reduced decisively, with transparency and checkability remaining the same.

In one corresponding development of the method according to the invention, each maneuver library may be adapted to a type of aircraft (for example flight power, new usage location), such that all of the flight paths derived therefrom are able to be used for all aircraft of the same type. This improves usability and reduces cost and time expenditure.

As an alternative, however, even when using other planning methods, a representation of the reachability set could be determined and reused depending on the flight state for a given type of aircraft.

By virtue of the preliminary planning using confidence intervals, each possible event that may occur during the flight is adequately taken into consideration before departure, as a result of which in particular comprehensibility to operators, airspace management (ANSPs: air navigation service provider) and aviation authorities is ensured.

The path planning method described here, depending on the refinement, comprises one or more, preferably all, of the following capabilities:
1. Preliminary planning of the flight path in an urban environment;
2. Taking into consideration landing sites and emergency landing methods;
3. Collision avoidance for detect-and-avoid (DAA);
4. Separation from adjacent air traffic (within the meaning of what is known as a "well-clear" function; specified by ATM/UTM—air traffic management or unmanned aircraft system traffic management).

Depending on the refinement, it is based on one or more, preferably all, of the following boundary conditions that should be specified before departure:
1. Landing site information, hazard potentials (for example on the ground, close to the ground and in the air), airspace structures, weather information, etc. are provided in an expanded 3D map of the flying area, these serving as a basis for the path planning method.
2. Limited interfering effects during nominal operation are assumed (for example maximum wind and gust strength), these possibly leading to deviations from the flight path.
3. Flight performance parameters (for example dynamics and kinematics) of the aircraft are known and are taken into consideration in the flight control and planning. In this case, positive and negative maximum values of the flight performance parameters and the structural properties of the aircraft determine the flight envelope.
4. Model quality (that is to say a deviation between the model and observed flying behaviour).
5. On the basis of points 2.-4., the reachability set is analyzed (that is to say the combined set of all of the possible states that may result from a controller specification due to errors, resolution inaccuracies, etc.).
6. Maneuver libraries (that is to say a finite number of possible flight path sections for path planning purposes) are provided, taking into consideration the reachability set (cf. FIGS. 1 and 3 below), this preferably having to take place only once for a given type of aircraft.
7. A set of confidence intervals with associated properties (for example maneuver subset, functional assignment) is defined and provided or linked to the reference trajectory.

There is an option for state automation during the flight, that is to say, to automatically execute an action that is triggered by entering a state (here a system state). The system state of the aircraft may result from sensor measured values, external data and/or a model prediction based thereon.

In a first corresponding development of the method according to the invention, there is accordingly provision for an expanded 3D map of the flying area in question to be provided (in electronic form) before departure, which map in particular comprises landing site information, hazard potentials (for example on the ground, close to the ground and in the air), airspace structures, weather information, etc. and serves as a basis for the path planning method.

In a second corresponding development of the method according to the invention, there is accordingly provision for the analysis of the reachability sets to take into consideration at least one of the following influencing variables:
- (external) interfering effects during nominal operation (for example a maximum wind and gust strength);
- flight performance parameters (for example dynamics and kinematics) of the aircraft (corresponding to the mentioned flight envelope);
- the model quality (that is to say the deviation between the model and observed real flying behaviour);

giving the combined set of all of the possible flight paths which, starting from the reference trajectory, may result from a (permissible) actuation of the flight control/regulation apparatuses of the aircraft and taking into consideration said errors, interfering influences and inaccuracies.

In the context of the method according to the invention, there is provision—as has already been described in detail—for the confidence intervals to each specify a (spatial, geographic) volume in which the aircraft is able to maneuver without a pre-planned path but that said aircraft is not able or allowed to leave or is able or allowed to leave only at predefined locations. In one corresponding development of the method according to the invention, the confidence intervals may furthermore preferably each be linked to at least one particular property, wherein most preferably a subset of the maneuver library is assigned to each confidence interval according to its property or function, wherein most preferably the execution of the maneuver is strictly prioritized within a confidence interval (for example according to the instructions of a prioritization protocol) and functions within a confidence interval may be able to be superimposed.

The function of a confidence interval determines the type of maneuvers that are permissible within the confidence interval (for example holding patterns, hard evasion, soft evasion, etc.). Further properties may be added depending on the function. By way of example, in a confidence interval that has the function "hard evasion" (that is to say rescuing passengers and aircraft using all available reserves), the permissible flight envelope will be less restricted than in the case of a confidence interval with the function "soft evasion" (evasion taking into account passenger comfort and system wear). Due to this, different subsets of a maneuver library that is possibly used may for example be approved for the confidence interval in question in order to explicitly rule out certain maneuvers in the planning.

A confidence interval may be approved for several functions. The properties of the functions in question are then overlaid (=superimposed). Depending on the implementation of the method, the combined set of all of the properties is then available for all of the functions or else—preferably—furthermore approved by a case distinction depending on the function.

Depending on the refinement of the method, this results in a multi-stage path planning process that comprises one or more of the following, preferably all of the following steps:
1. Identifying emergency landing sites on said map and preferably classifying them according to particular criteria (for example safety, hazard potential caused by the environment, hospital, suitability, reachability, etc.).
2. Pre-planning an optimized reference trajectory on the ground, that is to say before a flight or before the start of a mission on a user PC (computer with a user operating system) or before take-off on board the aircraft, on an embedded computer on board the aircraft.

3. Pre-planning the emergency or emergency landing trajectories at regular intervals on the ground on the user PC or before take-off on board the aircraft.
4. Defining and assigning confidence intervals along the pre-planned routes (the reference trajectory, possibly including the emergency trajectories).
5. Planning the actual flight path along the reference trajectory and—where applicable—within the confidence intervals on board the aircraft in real time. For this purpose, the following steps are preferably executed in succession and repeated over time:
   I. Updating the system state (by way of the system monitor, as a result of which the state machine updates the path planning mode)
   II. On the basis of this, in particular using a spatial coordinate and a required action (for example evasion), updating the confidence interval to be flown (see above).
   III. Updating the calculated flight path from the previous time step, taking into consideration confidence interval properties and prioritization protocol, for example through a model-based planning method with a restricted time horizon, for example a model predictive control (MPC) or a receding horizon method (RHM).

In one corresponding development of the method according to the invention, there is accordingly provision for the following steps to be executed, preferably in succession, before a flight:
   a. identifying emergency landing sites on a map, in particular the abovementioned 3D map, and preferably classifying them according to particular criteria (such as safety, hazard potential caused by the environment, hospital, suitability, reachability, etc.);
   b. pre-planning an optimized reference trajectory on the computer;
   c. pre-planning emergency/emergency landing trajectories at regular intervals along the reference trajectory on the computer;
   d. defining and assigning confidence intervals at least along the pre-planned reference trajectory, possibly including the emergency/emergency landing trajectories;
the results of which are stored in a database on board the aircraft and carried during the flight for the purpose of use in the real-time motion planning.

In another corresponding development of the method according to the invention, there is accordingly provision for an actual flight path along the reference trajectory and within the confidence intervals to be determined by the computer on board the aircraft during the real-time motion planning. This involves:
   i. updating the path planning mode by way of the state machine;
   ii. updating a current confidence interval to be flown on the basis of the system state;
   iii. updating the determined or calculated flight path from a previous time step, taking into consideration confidence interval properties and the prioritization protocol, for example through a model-based planning method with a restricted time horizon, for example a model predictive control (MPC) or a receding horizon method (RHM).

Depending on the refinement, the method developed by the Applicant is preferably performed to varying extents on the ground and during the flight on board the aircraft. The location where the ground proportion is executed may in this case be the on-board computer of the aircraft while it is on the ground or else an external user PC from which the results are transferred to the aircraft in an intermediate step before take-off. The real-time component is executed in flight and on board the aircraft on the on-board computer available there. The algorithm that is preferably provided for this purpose may be designed such that it is able to be executed both on a computer with a user operating system (user PC) and on embedded systems. A more precise specification of the computer hardware does not form the subject matter of the present invention.

Nevertheless, in the context of one specific development of the system according to the invention, there is provision for the real-time control unit to be designed as a computer located on board the aircraft, in particular an embedded system or user PC, on which an algorithm for real-time motion planning of the aircraft is set up and executed or is able to be executed.

One preferred development of the system according to the invention may accordingly make provision for the motion preliminary planning unit to be designed as an embedded system or as a user PC, wherein, in the case of a computer external to the aircraft, said parameters of a completely pre-planned mission are able to be transferred to the aircraft before take-off.

In order to simplify the real-time planning and execution of a flight connection between two points in space, the mission may be pre-planned in part on the ground based on existing maps (see the above description of the boundary conditions). The results thereof are preferably stored and carried in a database on board the aircraft. The complexity of the real-time algorithm is able to be reduced considerably with the additional assistance of this database. This reduction in the pre-planning and storage expenditure constitutes a meaningful advantage that is able to be achieved within the context of the invention.

Various data layers of said maps may be combined (fused) to form an abstract hazard potential that represents a kind of density of undesired influences on the aircraft and its mission as a function of a geographical location in the preliminary planning on the ground on the mission level. A weighted cost function consisting of this hazard potential, the number and kind of reachable emergency landing sites and an energy efficiency may optionally be applied in order to optimize a pre-planned flight route between a starting point and an end point. A flight route created in this way may then be expanded with trajectories for different path planning modes. Emergency trajectories to an in each case closest emergency landing site are calculated and stored in a database at route intervals that are preferably defined. Trajectories are preferably calculated per route interval taking into consideration various aircraft states (for example nominal state or failure scenarios in which for example at least one sensor delivers an inadmissible measured value—for example "battery state of charge too low") and optimization targets and likewise stored in the database. Optimization targets may be inter alia time, safety or efficiency optimality. The path planning preferably takes place using inherently known, quasi-random path planning algorithms. Deterministic properties are thereby forced. In the preferably next step, the confidence intervals within which the aircraft is able to maneuver freely if needed along the route may be planned (cf. FIG. 2). These confidence intervals may be stored together with a respective function, position and extent in the database. It may be ensured by an algorithm that each confidence interval remains within associated interval limits. If the preliminary planning takes place on an external computer, the preliminary planning database is transferred to the aircraft before the flight or the start of the mission.

In one advantageous development of the method according to the invention, there is accordingly provision for the method to be executed to varying proportions on the ground and during the flight on board the aircraft, wherein the location where the proportion executed on the ground is executed is the computer on board the aircraft while it is on the ground or an external computer, from which external computer the results of the preliminary planning are transferred to the aircraft in an intermediate step before take-off, whereas the proportion executed in flight is executed on board the aircraft on the computer there, wherein the algorithm in question is preferably designed such that it is able to be executed both on a computer with a user operating system and on embedded systems.

In another development of the method according to the invention, there is accordingly provision for the map that is used to comprise different data layers and for different data layers of the map to be combined to form an abstract hazard potential that represents a density of undesired influences on the aircraft and its mission as a function of a location, such that a weighted cost function consisting of this hazard potential, a number and kind of reachable emergency landing sites and an energy efficiency is able to be applied in order to optimize a pre-planned flight route between a start point and an end point.

In yet another development of the method according to the invention, there is provision for the flight route to be expanded with trajectories for different path planning modes, for which purpose emergency trajectories to the in each case nearest emergency landing site are calculated and stored in a database at defined route intervals, wherein trajectories are preferably calculated and stored per route interval, taking into consideration various aircraft states and optimization targets, which optimization targets may be inter alia a time, safety or energy efficiency optimum.

It has already been pointed out that there is provision, in the context of the method according to the invention, to plan confidence intervals, preferably as defined further above, along the flight route, within which confidence intervals the aircraft is able to maneuver, preferably freely or without restriction, when required. These confidence intervals are stored in the database, preferably with information regarding their function, a geographical position and spatial extent, wherein it is most preferably ensured that the aircraft remains within associated interval limits for a given confidence interval using an algorithm and in terms of flight control.

In the course of the real-time planning and execution on board the aircraft, the pre-planned path may serve as a reference trajectory during the flight. During the flight, the actual path is preferably calculated by way of an optimization method that generates, at least temporarily or in sections by linking maneuvers from the maneuver library in each time step, a path following the reference trajectory and having a restricted time horizon, that is to say does not necessarily plan until the end of the mission (this gives a particular kind of maneuver automation), wherein the use of maneuver libraries is just one option of many.

In one corresponding development of the method according to the invention, there may accordingly be provision for the pre-planned flight route to serve as reference trajectory during the flight, whereas the actual flight path during the flight is calculated by way of an optimization method and a real-time algorithm by the computer on board the aircraft, wherein the actual flight path generates, at least temporarily or in sections by linking maneuvers from the maneuver library, in each time step, a flight path following the reference trajectory and having a restricted time horizon.

The real-time control or the real-time algorithm preferably used for this purpose, in one corresponding refinement, comprises a state machine (see above) that determines or selects a path planning mode to be used based on an instantaneous system state of the aircraft as recorded by sensors. At each time step, said algorithm preferably selects between a finite number of discrete, predefined path planning modes, each of which in each case corresponds to the nominal path, an emergency/emergency landing trajectory or a confidence interval and associated maneuver subset in one advantageous development of the invention (cf. FIG. 3). The path planning preferably follows a maneuver protocol that hierarchically regulates a sequence of maneuvers depending on the respectively available options. Each confidence interval remaining within the associated interval limits is preferably ensured using an algorithm.

In one corresponding development of the method according to the invention, there may accordingly furthermore be provision for the real-time algorithm to interact with the state machine that determines or selects a path planning mode on the basis of an instantaneous system state of the aircraft which may be determined by sensors, wherein the real-time algorithm is preferably able to select between a finite number of discrete path planning modes in each time step, each of which in each case corresponds to the pre-planned flight route, an emergency/emergency landing trajectory or a confidence interval and associated maneuver subset.

One preferred development of the system according to the invention may accordingly make provision for said system to additionally comprise a state machine on board the aircraft that is preferably designed as an algorithm or switching logic and that triggers (selects) different system behaviour depending on system and environment data that may be recorded by sensors on board the aircraft and external data, such as for example UTM/ATM data, weather data, etc., wherein the state machine is executed or is able to be executed on board the aircraft and during the flight.

The entire mission planning may be divided into sections, for example into the sections take-off, (normal) flight and landing. Different priorities and subsets of the maneuver library may in each case be defined for these sections. By way of example, priority is given to a horizontal evasion as an exemplary maneuver ahead of a vertical evasion (another possible maneuver) during a take-off or landing procedure; this may preferably be the complete opposite during the flight.

In a first corresponding development of the method according to the invention, there is accordingly advantageously provision for the entire motion planning to be divided into different sections, in particular take-off, flight and landing, wherein different prioritization protocols and subsets of the maneuver library are preferably defined for at least some sections.

In another corresponding development of the method according to the invention, there is accordingly provision for the generation of the flight path to follow a prioritization protocol that regulates a sequence of maneuvers depending on the available options.

If a corresponding guideline from the responsible aviation authorities exists, the individual steps of the method may be approved separately by the authorities for use and be integrated in a simplified manner to form a solution that is approved overall.

According to another development of the system according to the invention, the real-time control unit preferably interacts with the storage unit and the state machine in order to calculate an actual flight path based on the stored parameters and the system behaviour triggered by the state machine (or a selected path planning mode) and to output corresponding control/regulation signals to the flight control/regulation apparatuses of the aircraft.

According to yet another development of the system according to the invention, the motion preliminary planning unit and a preliminary planning algorithm executed thereon preferably has inputs 1) for map material and corresponding map data in the form of distributed map formats and 2) for inputting start and destination coordinates, these preferably being input as a text file or by way of a user interface, and outputs for 1) preferably georeferenced, parameterized or non-parameterized trajectories, most preferably in tabular form, and 2) preferably georeferenced confidence intervals, most preferably in tabular form. The input data are preferably stored or transferred to the database present on board the aircraft.

According to yet another development of the system according to the invention, the database located on board the aircraft preferably contains:
   map material of the mission;
   said parameters from the preliminary planning, in particular trajectories and confidence intervals;
   maneuver libraries containing the abovementioned relevant features;
   prioritization protocols containing the relevant abovementioned features.

In one corresponding refinement of the system according to the invention, the real-time algorithm may comprise the state machine or at least partly be embodied thereby. The system state (inter alia recorded by sensors) of the aircraft from system monitoring may accordingly be present as input signal at its input, whereas its output signal indicates an associated, selected path planning mode for further consideration in the path planning.

The actual (real-time) path planning algorithm, which is preferably executed on board the aircraft on an embedded computer, preferably receives the following inputs or signals or parameters:
1. a state vector consisting of a state estimation (this vector is preferably based on a sensor data fusion consisting of measured data from different sensors of the aircraft and possibly its environment), on the basis of which sensor data a physical state of the aircraft is able to be estimated based on a model (for example derived variables such as position angle, etc. are able to be determined from a model prediction from direct measured values such as pressure, temperature, GPS data, rate of rotation and acceleration);
2. the reference plan from the database (see above);
3. the maneuver library (libraries) from the database (see above);
4. the path planning mode determined or selected by the state machine (see above); and
5. the maneuver prioritization (prioritization protocol) from the database (see above).

A path vector (p, $\dot{p}$, $\ddot{p}$, $\dddot{p}$, $\psi$, $\dot{\psi}$, $\ddot{\psi}$) is preferably output to a regulation and/or actuation apparatus for relevant actuators of the aircraft as output data, by way of which actuators it is possible to affect the flying behaviour of the aircraft, such as for example motors, tail units or the like. This vector may contain a position specification p and its time derivatives ($\dot{p}$, $\ddot{p}$, $\dddot{p}$) and—without restriction—the yaw angle Psi ($\psi$) and its time derivatives ($\dot{\psi}$, $\ddot{\psi}$) or other variables able to be used for flight control.

In the course of one corresponding development of the system according to the invention, there may accordingly be provision for the computer located on board the aircraft and a path planning algorithm executed thereon to have inputs for
1. a state vector consisting of a state determination (or estimation), preferably based on a model, on the basis of a sensor data fusion of data from different sensors of the aircraft;
2. parameters from the database;
3. maneuver libraries from the database;
4. a signal relating to the system behaviour from the state machine;
5. the prioritization protocols from the database;

and an output for a path vector (p, $\dot{p}$, $\ddot{p}$, $\dddot{p}$, $\psi$, $\dot{\psi}$, $\ddot{\psi}$) to be output to the regulation and/or actuation apparatus, in particular a path vector with a position specification p and the time derivatives thereof and the yaw angle θ and the time derivatives thereof.

The following terms are important in the context of the present description and are intended to be explained briefly again:

The "preliminary planning unit" is preferably—but without restriction—a computer located on the ground (embedded computer or user PC) on which a preliminary planning algorithm is executed. The location of this computer is expressly not defined more accurately since it may be both the on-board computer of the aircraft (when said aircraft is on the ground) and an external computer in a ground control station from which the pre-planned mission is able to be transferred to the aircraft.

The "state machine" may be present in the form of switching logic or in the form of a (software-based) algorithm; it preferably triggers different system behaviour depending on events that are to be defined (able to be measured using sensors by the aircraft or the sensors thereof), wherein it in particular selects between predefined path planning modes. The state machine is located on board the aircraft and is executed or operated there during the flight. A monitoring algorithm or a comprehensive system monitor, which determines the respective state of the system "aircraft" and its environment (temperature, wind speed, etc. and possibly external data) from sensor data and outputs a corresponding result (signal) to the state machine, preferably serves as input for the state machine. The monitoring algorithm/system monitor as such does not form the subject matter of this invention.

The "real-time control unit" is preferably a computer located on board the aircraft (embedded or user PC) and on which an algorithm for controlling the aircraft is executed. Based on the results of the preliminary planning and the state specification of the state machine, the actual flight path is calculated in real time on the real-time control unit and forwarded to the flight controller (for example the abovementioned regulation and/or actuation apparatus).

BRIEF DESCRIPTION OF THE DRAWINGS

Further properties and advantages of the invention become apparent from the following description of exemplary embodiments with reference to the drawing.

DETAILED DESCRIPTION

Figure 1:
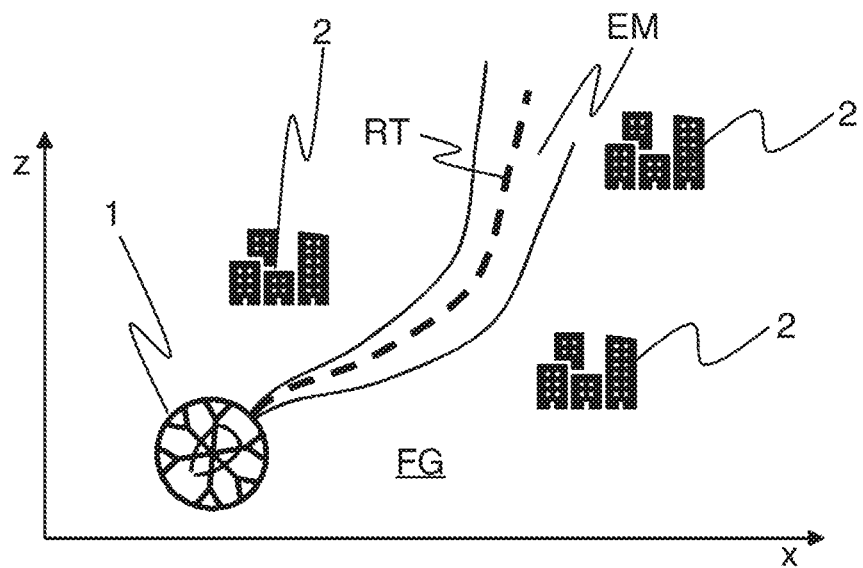
FIG. 1 schematically shows a set of reachable flight paths determined in the motion preliminary planning.

FIG. 1 schematically illustrates a reference trajectory RT that is determined when performing the motion preliminary planning. Reference sign EM furthermore illustrates a set of reachable flight paths (what is known as reachability set). Reference sign 1 denotes a VTOL aircraft in the manner of a preferably people-carrying, electrically driven multicopter, for example the Volocopter® 2X from the Applicant's company. Reference signs x and z denote (two) spatial directions or spatial coordinates. FIG. 1 for the most part corresponds to a map that provides landing site information, hazard potentials, airspace structures, etc. in an expanded 3D map of a flying area FG and that serves as a basis for the path planning method. Reference sign 2 shows obstacles, that is to say examples of hazard potentials for the aircraft 1, for example houses, that are located at corresponding values of x and z. Reference sign RT denotes the reference trajectory determined in the context of the preliminary planning; the surface area or the volume EM (envelope of possible flight routes) describes a limited set of possible deviations that occur from the commanded path or the reference trajectory RT, which deviations may result for example due to external interfering influences or an insufficient resolution of control/regulation variables of the aircraft 1. The preliminary planning therefore preferably also includes, in addition to the already mentioned landing site information, hazard potentials, airspace structures, etc., even more influencing variables, such as limited interfering effects during nominal operation (for example maximum wind and gust strength), flight performance parameters (for example dynamics and kinematics) of the aircraft 1 and the model quality (that is to say a deviation between the model and an observed flying behaviour). This results in the shown surface area FE, which represents a closed set of flight paths able to be reached by the aircraft 1, preferably a conservatively estimated combined set of all of the flight paths able to be reached theoretically by the aircraft 1 (reachability set). The corresponding information is suitably prepared in terms of data and stored for subsequent use.

Figure 2:
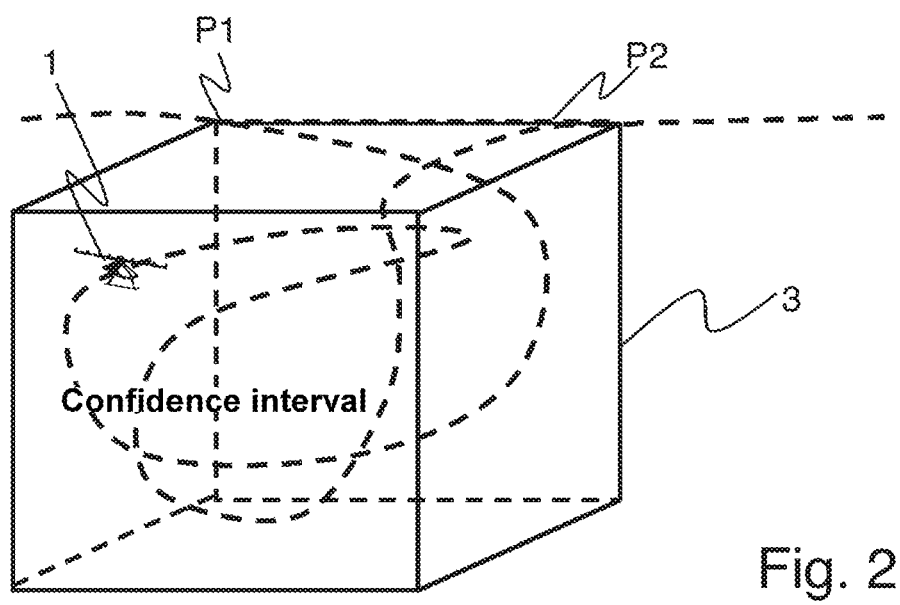
FIG. 2 shows an example of a confidence interval in which an aircraft is able to maneuver freely.

Reference sign 3 in FIG. 2 shows a confidence interval with an aircraft located therein, for example the aircraft 1 according to FIG. 1. The aircraft is able to maneuver freely in the confidence interval 3 but is able to fly (fly into) or leave the confidence interval only at defined points P1, P2. In other words: The confidence intervals 3 each specify a spatial geographical volume in which the aircraft 1 is allowed to maneuver (freely) even without a pre-planned path, whereas it is however not able or not allowed to leave the volume, or is allowed to do so only at predefined locations P1, P2. This corresponding information, in particular the position and/or size of the confidence intervals 3, is also suitably prepared in terms of data and stored for subsequent use. The confidence intervals 3 are preferably each linked to at least one particular property, wherein most preferably a subset of a maneuver library (see below, FIG. 3) is assigned to each confidence interval 3 according to its property or function. In this case, the execution of the maneuver is most preferably strictly prioritized within a confidence interval 3 (for example according to the instructions of a prioritization protocol), and functions within a confidence interval may be able to be superimposed. Reference may additionally be made at this point to the definition of the term "function" in the general part.

Figure 3:
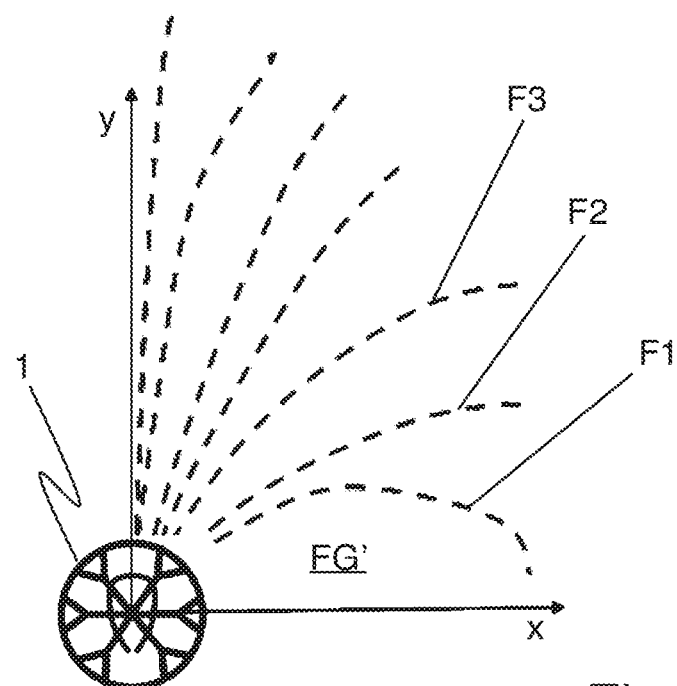
FIG. 3 shows a maneuver library of pre-calculated and combinable maneuvers.

FIG. 3 schematically shows a graphical depiction of a maneuver library containing pre-calculated and combinable (flying) maneuvers of the aircraft 1. The coordinates x and y specify two possible spatial directions within a flying area FG'. Maneuver libraries (that is to say a finite set of possible flight paths F1, F2, F3, etc. for the path planning; not all referenced for the sake of clarity) are provided for the path planning, taking into consideration the reachability set (EM, cf. FIG. 1). Quasi-deterministic preliminary planning via quasi-discrete states and while limiting the number of flying maneuvers taken into consideration is thereby made possible, in connection with strict prioritization (for example flight path F1 has a higher priority than flight path F2, which in turn has a higher priority than flight path F3). In the real-time flight control, the number of flying maneuvers F1, F2, F3, etc. to be taken into consideration is accordingly limited to the maneuver libraries. The maneuver libraries are kept in a database on board the aircraft 1, taking into consideration various performance states of the aircraft 1 (for example nominal state, failure scenarios, environmental conditions).

Figure 4:
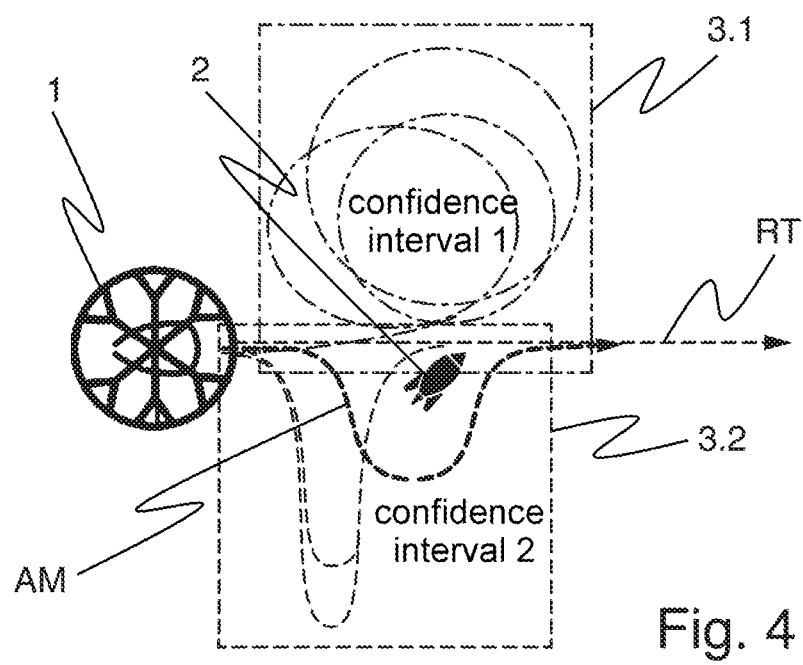
FIG. 4 shows the principle of path preliminary planning with confidence intervals.

FIG. 4 shows the principle of path preliminary planning for a flight from A to B with confidence intervals 3.1-3.5: A planned flight path or reference trajectory RT is expanded with emergency trajectories N1, N2, N3, etc. (only a few referenced explicitly) to emergency landing sites $ELS_i$, i=1, 2, etc. and with the confidence intervals 3.1-3.5, which confidence intervals 3.1-3.5 do not have to be arranged without any gaps along the reference trajectory RT. Flight levels $FL_1$, $FL_0$, $FL_{-1}$ are defined in the vertical (lower part of FIG. 4). In a given confidence interval 3.1-3.5 (that is to say when the aircraft 1 is located in such a confidence interval), the real-time controller of the aircraft 1 performs planning freely in the horizontal plane within the existing boundary conditions (upper part of FIG. 4) and may additionally change the flight levels $FL_1$, $FL_0$, $FL_{-1}$ in the vertical, taking into account any prioritizations, for example climbing ($FL_{-1}$ after $FL_0$ or $FL_0$ after $FL_1$) ahead of descending ($FL_1$ after $FL_0$ or $FL_0$ after $FL_{-1}$). The mission may be divided into various areas or sections, for example take-off, normal flight (not referenced) and landing, as illustrated.

Figure 5:
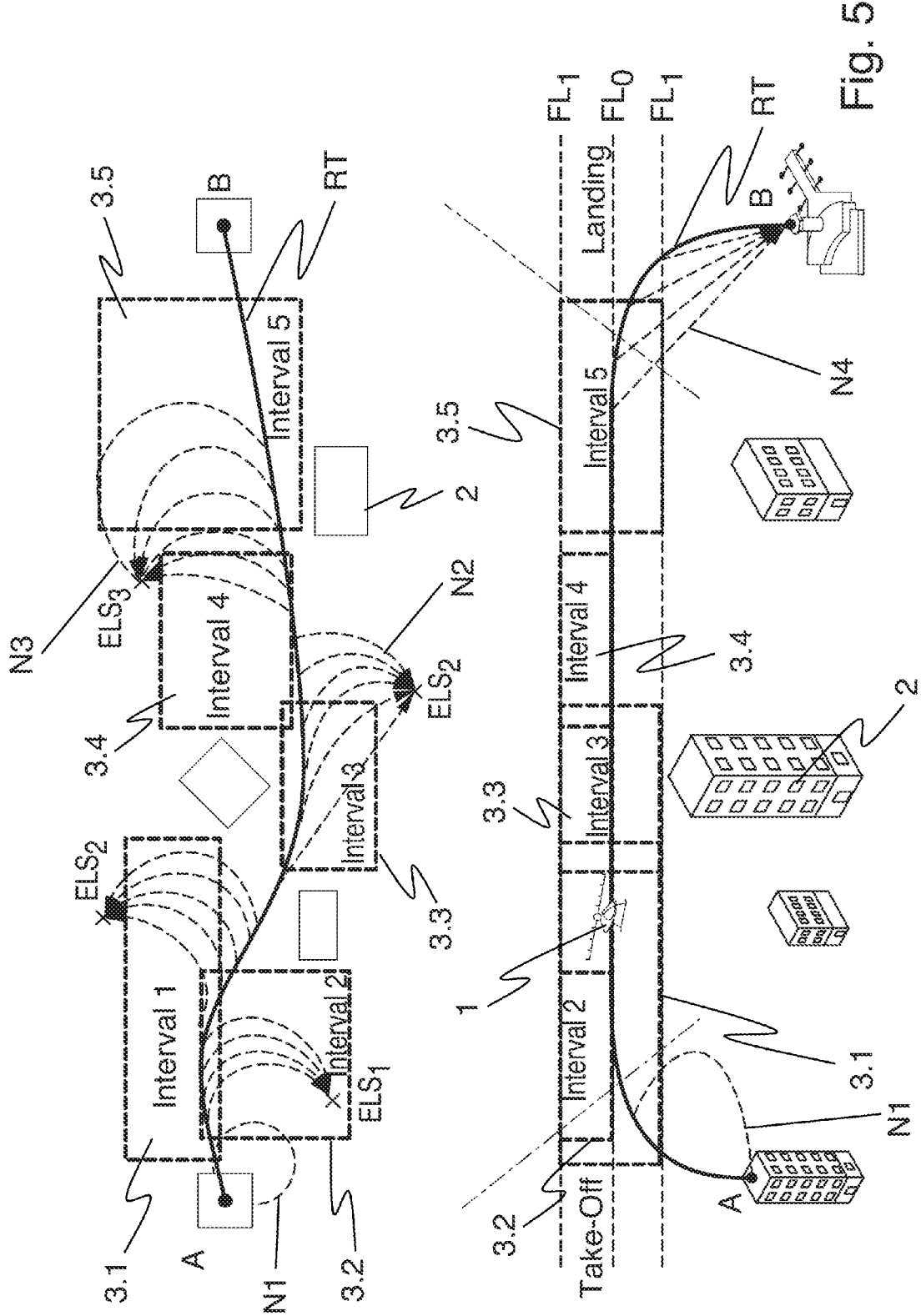
FIG. 5 shows real-time planning with confidence intervals.

FIG. 5 schematically shows the real-time planning of a flight path with confidence intervals 3.1, 3.2: The real-time planner (real-time controller; not shown) or the aircraft 1 equipped therewith may fly one of the two confidence intervals 3.1, 3.2 or the illustrated (straight) reference trajectory RT at the critical time t (not referenced). The state machine (not shown here) on board the aircraft 1 selects the confidence interval 2 (reference sign 3.2) based on a detected obstacle 2 with the assigned function or specification "hard evasion", which corresponds to a path planning mode. The Volocopter (the aircraft 1) accordingly flies around the obstacle 2 within the confidence interval 3.2 by way of associated (permissible) maneuvers and then returns to the reference path (reference trajectory RT). In the present case, the aircraft 1 carries out a horizontal evasion maneuver (on the flight path AM planned in real time). According to the prioritization protocol, this may mean that the hazard or the obstacle 2 was detected too late to safely slow down the aircraft 1 while still on the reference trajectory RT (which would have had a higher priority), and that the vertical space (higher or lower flight levels, cf. FIG. 4) is/was blocked, such that preferred maneuvers, for example climbing to another flight level (cf. FIG. 4), were not actually able to be executed.

Figure 6:
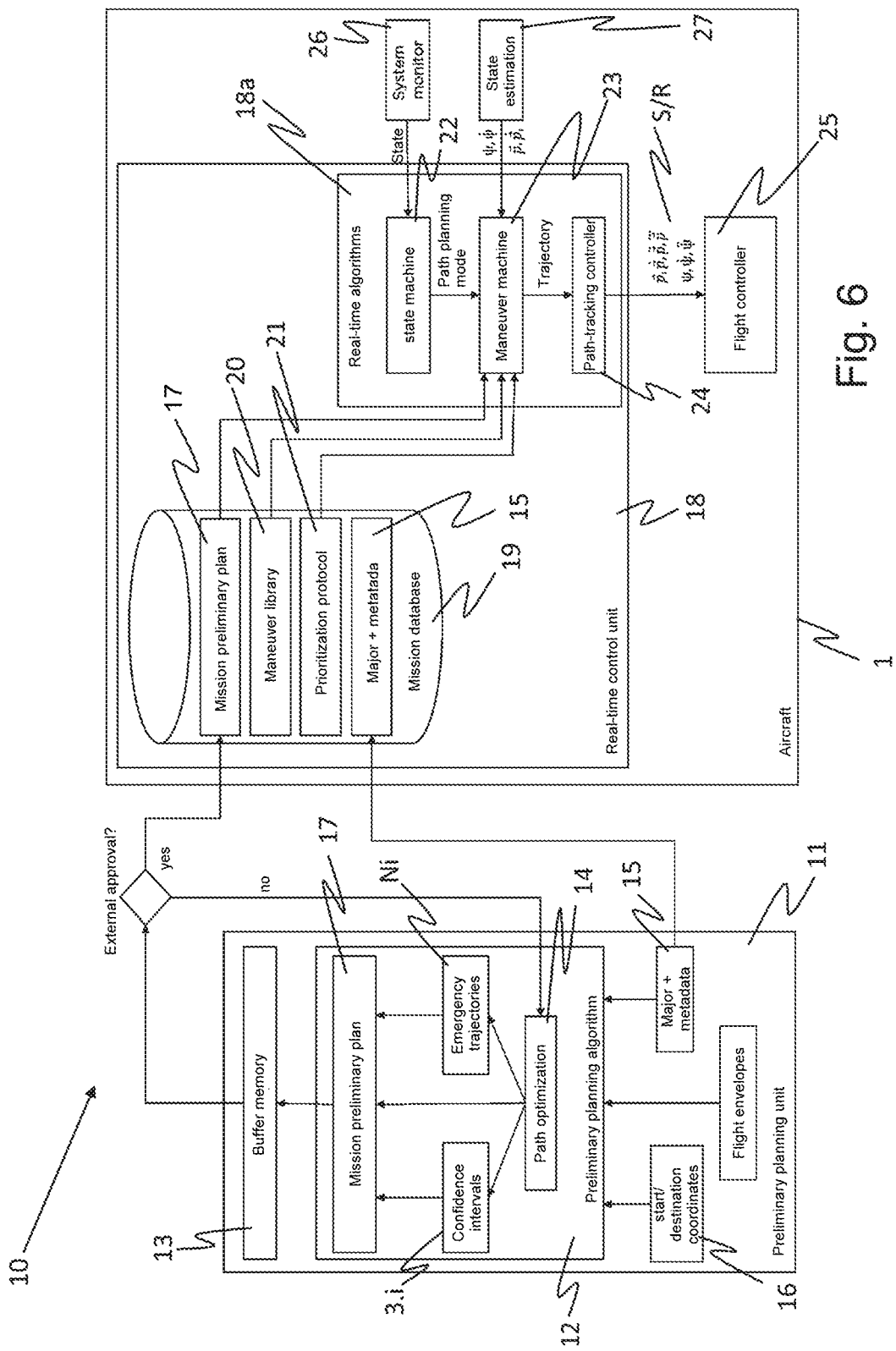
FIG. 6 shows a block diagram of the described path planning method and of a corresponding system with corresponding hardware allocation.

FIG. 6 shows a block diagram of the described path planning method with corresponding hardware allocation. The degree of detail and scope of the preliminary planning is variable.

The block diagram in FIG. 6 specifically shows a motion planning system 10 for aircraft 1 (cf. FIGS. 1 to 5), in particular for electrically driven, load-carrying and/or people-carrying multicopters. The system 10 comprises a motion preliminary planning unit 11 that is designed and intended to execute a preliminary planning algorithm 12 by way of a computer, not shown in more detail, on the ground or on board an aircraft 1 in question, by way of which algorithm a reference trajectory RT (cf. for example FIG. 4 or FIG. 5) is able to be determined. In the preliminary planning unit 11, the system 10 comprises a storage unit, referenced as buffer memory 13, in which parameters of the reference trajectory and parameters relating to a permissible deviation of the aircraft from the reference trajectory according to the instructions of the motion preliminary planning unit 11 are stored or are able to be stored. The preliminary planning algorithm 12 is based, in addition to the reachability set (cf. reference sign EM in FIG. 1), on maps and metadata 15, the flight envelope (that is to say the operational limits of a respective type of aircraft in terms of flight mechanics; reference may be made to the definition in the introductory part) and start/destination coordinates 16, and contains criteria for path optimization 14, for example with regard to flight time or energy efficiency, with the consultation of confidence intervals 3.$i$ and emergency trajectories $N_i$, i=1, 2, . . . (cf. for example FIG. 4). This results in a complete mission preliminary plan 17 whose parameters are stored (as mentioned) in the storage unit 13.

A real-time control unit 18 on board the aircraft 1 is configured for real-time motion planning of the aircraft 1 using said parameters from the (buffer) memory 13, these being/having been transferred to the aircraft 1 possibly before take-off and stored there in a mission database 19. This mission database 19 accordingly comprises the complete mission preliminary plan 17 plus maneuver library (libraries) 20 (cf. FIG. 3), prioritization protocol(s) 21 and the mentioned maps and metadata 15 (transferred after external approval of the mission preliminary plan has taken place). The real-time control unit 18 furthermore executes a real-time algorithm 18a, by way of which a state machine 22, an actuation apparatus in the form of a maneuver machine 23 and a path-tracking controller 24 are defined. The state machine 22 interacts with a system monitor 26 that determines a (system) state of the aircraft 1 on the basis of sensor measured data and data traffic (not illustrated) internal and external to the system by preferably recording all of the available data or information about the aircraft 1. The maneuver machine 23 receives information regarding a preferably predefined path planning mode, which the state machine 22 has selected on the basis of the system state communicated by the system monitor 26, from the state machine 22. "Nominal", "planning with limited system power", "land as soon as practical/possible", "safety-optimized planning" or the like for example come into consideration as path planning mode, which may be correlated with a corresponding system state: Examples of possible system states are: "nominal", (different) emergencies (for example "battery damage", "engine failure", "navigation failure", "slightly limited system power", etc.) or what are known as "contingency states" (for example prioritization of military air traffic). The confidence interval functions defined further above, such as evasion, immediate emergency landing, waiting, etc. should be distinguished therefrom. A path planning mode may be linked to maneuvers respectively assigned thereto (from the maneuver library/libraries 20 (cf. FIG. 3)) and/or to corresponding prioritization protocol(s) 21. In general, the state machine 22 determines a state (of the aircraft 1) and selects at least one associated action (path planning mode). The maneuver machine 23 then determines the flight path (trajectory) in real time on the basis of a state estimation 27 based on the information 17, 20, 21 from the mission database 19 and on the basis of the known system state based on a physical model of the aircraft 1. It is thus possible for example to derive control-relevant parameters, such as position angle, from directly measured variables, such as pressure, temperature or rate of rotation. The maneuver machine 23 provides this trajectory in a suitable data format to the path-tracking controller 24, which accordingly actuates the flight control/regulation apparatuses 25 of the aircraft 1 by way of control/regulation signals S/R derived from the real-time motion planning (path vector (p, $\dot{p}$, $\ddot{p}$, $\dddot{p}$, $\psi$, $\dot{\psi}$, $\ddot{\psi}$)), in order to influence physical flying behaviour of the aircraft 1.

In the system 10 that is shown, the motion preliminary planning unit 11 may be designed as an embedded system or as a user PC, wherein, in the case of a computer external to the aircraft 1, said parameters of a pre-planned mission 17 are able to be transferred to the aircraft 1 or the mission database 19.

In the system 10 that is shown, the real-time control unit 18 is designed as a computer located on board the aircraft, in particular an embedded system or a user PC, on which the described algorithm 18a for real-time motion planning of the aircraft 1 is set up and executed or is able to be executed.

In the system 10 that is shown, the real-time control unit 18 interacts with the storage unit (mission database 19) and the state machine 22 in order to calculate an actual flight path (trajectory) on the basis of the parameters stored in the mission database 19 and the system behaviour triggered by the state machine 22 (path planning mode) and to output corresponding control/regulation signals S/R to the flight control/regulation apparatuses 25 of the aircraft 1.

Figure 7:
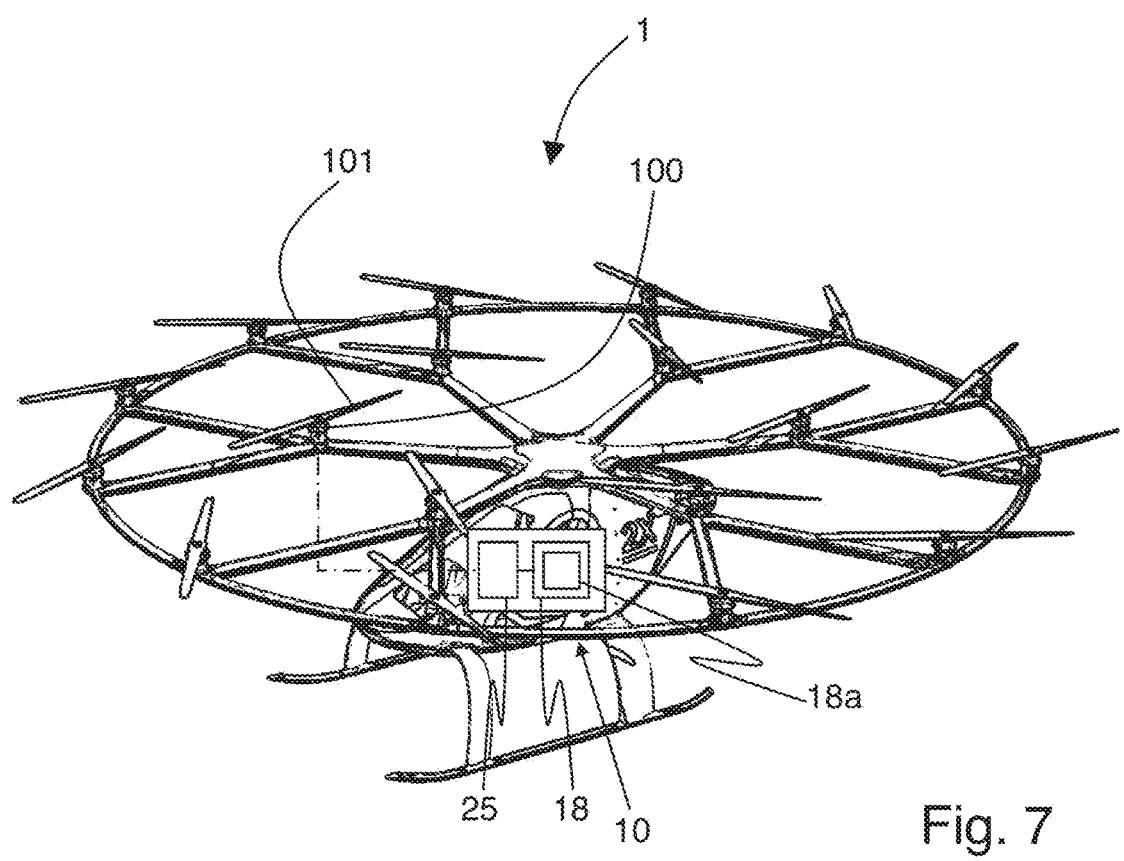
FIG. 7 shows the use of the system from FIG. 6 in a multicopter.

Finally, FIG. 7 illustrates an example of the use of the system from FIG. 6 in the case of a Volocopter® 2X multicopter, not all of the components from FIG. 6 being illustrated again for the sake of clarity. The real-time control unit 18 that executes the algorithm 18a for the real-time motion planning of the aircraft 1 is located on board the aircraft 1. The real-time control unit 18 controls or regulates a (drive) motor 100, given by way of example, of the aircraft 1 via the flight control/regulation apparatuses 25 of the aircraft 1 (preferably controls or regulates all of the motors of the aircraft 1 and possibly additional control apparatuses, such as tail units or the like), which motor 100 is intended to drive a rotor or propeller 101. The flying behaviour of the aircraft 1 is thereby able to be influenced within the meaning of real-time path planning.

The invention claimed is:

1. A motion planning method for aircraft (1), the method comprising:
    motion preliminary planning using a ground or aircraft-based computer, including determining a reference trajectory (RT), preliminary planning of emergency trajectories (Ni), including emergency landing trajectories (N1, N2, etc.), at intervals along the reference trajectory (RT), and defining confidence intervals (3.1-3.5) along the reference trajectory (RT), which said confidence intervals (3.1-3.5) in each case specifying a spatial volume in which the aircraft (1) is maneuverable without a pre-planned path but that the aircraft (1) is not able to leave or is able to leave only at predefined locations (P1, P2);
    storing parameters of the reference trajectory (RT) and parameters with regard to a permissible deviation of the aircraft (1) from the reference trajectory (RT) and the confidence intervals (3.1-3.5) in a database (19) on board the aircraft (1);
    real-time motion planning on board the aircraft (1) using said parameters and the confidence intervals (3.1-3.5) and environment and system data of the aircraft recorded by sensors or provided externally, from which environment and system data a system state of the aircraft (1) is derivable; and
    actuating flight control/regulation apparatuses (25) of the aircraft (1) using control/regulation signals (S/R) derived from the real-time motion planning;
    wherein the flight control/regulation apparatuses (25) of the aircraft (1) are actuated such that the aircraft (1) is moved either
    a) along the reference trajectory (RT) or
    b) along a real-time trajectory within the confidence interval (3.1-3.5) or along one of the emergency trajectories with a given or required deviation from the reference trajectory (RT).

2. The method as claimed in claim 1, further comprising performing the motion preliminary planning before a flight or a mission in order to obtain a preliminary planning result (17) taking into consideration a maximum deviation from the reference trajectory and a specification of strict prioritization protocols (21) in order to achieve real-time executability with quasi-deterministic behaviour on a computer (18), comprising either a ground-assisted computer or a computer (18) on board the aircraft (1), and
    wherein the preliminary planning result (17) taking into consideration the maximum deviation from the reference trajectory and the confidence intervals (3.1-3.5) and the prioritization protocols (21) are stored in the database (19),
    determining using a state machine (22) on board the aircraft (1), on the basis of a current environment and system state that is determined on the basis of sensor data from the sensors located on board the aircraft (1) and external data, a path planning mode that is permissible at a given time during the flight, by which path planning mode, at all times, either the flight is able to be completed by reaching a destination (B) of the aircraft (1) or is able to be safely ended early through a safe emergency landing or by reaching an alternative destination,
    wherein the motion planning is performed in real time automatically during the flight by the computer (18) on board the aircraft (1) in accordance with the determined path planning mode, taking into consideration a set of reachable states or flight paths and strict prioritization of predefined types of maneuver based on the prioritization protocols (21), while complying with the defined confidence intervals (3.1-3.5) and predefined flight levels ($FL_{-1}$, $FL_0$, $FL_1$), and a result of said real-time motion planning is used by the controller for real-time flight control of the aircraft (1).

3. The method as claimed in claim 2, wherein the combined set of all of the permissible flight paths is determined and validated before the flight or the mission.

4. The method as claimed in claim 3, wherein a number of flying maneuvers taken into consideration during the real-time flight control is limited through a restriction to maneuver libraries (20) that comprise a finite number of possible flight paths or flight path sections for path planning, said maneuver libraries (20) being stored in a database (19) on board the aircraft (1), wherein the maneuver libraries (20) comprise predefined control/regulation signals (S/R) for flight control/regulation apparatuses (25) of the aircraft (1).

5. The method as claimed in claim 4, wherein each said maneuver library (20) is adapted to a type of the aircraft, such that all of the flight paths derived therefrom are able to be used for all said aircraft (1) of the same type.

6. The method as claimed in claim 1, further comprising providing a map of a flying area in question before departure, said map comprising at least one of landing site information, hazard potentials (2), or airspace structures, and serves as a basis for the path planning method.

7. The method as claimed in claim 3, further comprising taking into consideration at least one of the following influencing variables in order to determine the maximum deviation from the reference trajectory (RT):
    external interfering effects on the aircraft (1) during nominal operation;
    flight performance parameters of the aircraft (1);
    a model quality of the motion preliminary planning; and
    the analysis giving a combined set of all of the possible flight paths that, starting from the reference trajectory (RT), may result from a permissible actuation of the flight control/regulation apparatuses (25) of the aircraft (1).

8. The method as claimed in claim 4, wherein
    a subset of the maneuver library (20) is assigned to at least one of the confidence intervals (3.1-3.5) according to an assigned function, and an execution of the maneuver is strictly prioritized within a confidence interval (3.1-3.5).

9. The method as claimed in claim 2, further comprising executing the following steps in succession before a flight:
    a. identifying emergency landing sites on a map, and classifying them according to criteria;
    b. pre-planning an optimized reference trajectory (RT) on the computer (11);
    c. pre-planning the emergency trajectories (Ni), including the emergency landing trajectories (Ni), at intervals along the reference trajectory (RT) on the computer (11);
    d. defining and assigning the confidence intervals (3.1-3.5) at least along the pre-planned reference trajectory (RT); and storing results in a database (19) on board the aircraft (1) and using the results during the flight for the real-time motion planning.

10. The method as claimed in claim 9, further comprising determining an actual flight path along the reference trajectory (RT) and within the confidence intervals (3.1-3.5) by the computer (18) on board the aircraft (1) during the real-time motion planning, including:

i. updating the path planning mode by way of the state machine (22);

ii. updating a current one of the confidence intervals (3.1-3.5) to be flown on the basis of the system state;

iii. updating the calculated flight path from a previous time step, taking into consideration confidence interval properties and the prioritization protocol (21).

11. The method as claimed in claim 6, further comprising

Combining different data layers of the map to form an abstract hazard potential that represents a density of undesired influences on the aircraft (1) and the mission as a function of a location (x, y, z), such that a weighted cost function consisting of said hazard potential, a number and kind of reachable emergency landing sites and an energy efficiency is able to be applied in order to optimize a pre-planned flight route between a start point (A) and an end point (B).

12. The method as claimed in claim 1, further comprising

Storing the confidence intervals (3.1-3.5) in the database (19) with information regarding at least one of a function, position or extent thereof, wherein each of the confidence intervals (3.1-3.5) remains within associated interval limits using an algorithm.

13. The method as claimed in claim 4, wherein the pre-planned flight route serves as reference trajectory (RT) during the flight, and the method further comprises calculating an actual flight path during the flight by an optimization method and a real-time algorithm based on the real-time motion planning by a computer (18) on board the aircraft (1), and said actual flight path generates, at least temporarily by linking maneuvers from the maneuver library (20), and in each time step, a flight path following the reference trajectory (RT) and having a restricted time horizon.

14. The method as claimed in claim 13, further comprising the real-time algorithm interacting with the state machine (22) that determines the path planning mode from an instantaneous system state, the real-time algorithm selects between a finite number of discrete path planning modes in each said time step, each of which in each case corresponds to the pre-planned flight route, an emergency trajectory, or one of the confidence intervals (3.1-3.5), and a relevant one of a subset of the maneuver library (20) is assigned to at least one of the confidence intervals (3.1-3.5) according to an assigned function, and an execution of the maneuver is strictly prioritized within a confidence interval (3.1-3.5).

15. The method as claimed in claim 14, wherein the generation of the flight path follows a prioritization protocol (21) that regulates a sequence of maneuvers depending on available options.

16. The method as claimed in claim 4, wherein an entire motion planning is divided into different sections, including take-off, normal flight and landing, and different prioritization protocols (21) and subsets of the maneuver library (20) with the relevant features are defined for at least some sections.

17. The method as claimed in claim 16, wherein the method is executed to varying extents on the ground and during the flight on board the aircraft (1), and a location where a proportion executed on the ground is executed is the computer (18) on board the aircraft (1) while it is on the ground or an external computer (11), and the results of the preliminary planning (17) on the external computer (11) are transferred to the aircraft (1) in an intermediate step before take-off, and the component executed in flight is executed on board the aircraft (1) on the computer (18) there, wherein an algorithm (18a) is configured such that it is executable both on the computer (18) on the aircraft with a user operating system and on embedded systems.

18. A motion planning system (10) for aircraft (1), the motion planning system comprising:

a motion preliminary planning unit (11) configured to execute a preliminary planning algorithm (12) using a ground based computer or an aircraft based computer (1) in question, by which algorithm a reference trajectory (RT), emergency trajectories (Ni), including emergency landing trajectories (N1, N2, etc.), are determined at intervals along the reference trajectory (RT) and confidence intervals (3.1-3.5) are determined along the reference trajectory (RT), with said confidence intervals (3.1-3.5) in each case specifying a spatial volume in which the aircraft (1) is able to maneuver without a pre-planned path but that the aircraft (1) is not able to leave or is able to leave only at predefined locations (P1, P2);

a storage unit with a memory in which parameters of the reference trajectory (RT), parameters of the confidence intervals (3.1-3.5) and parameters regarding a permissible deviation of the aircraft (1) from the reference trajectory (RT) are stored in a database (19) on board the aircraft (1) according to instructions of the motion preliminary planning unit (11);

a real-time control unit (18) on board the aircraft (1) that is configured for real-time motion planning of the aircraft (1) using said parameters and the confidence intervals (3.1-3.5) and using an amount of environment and system data of the aircraft (1) recorded by sensors or provided externally; and an actuation apparatus (23) configured to actuate flight control/regulation apparatuses (24, 25) of the aircraft (1) by way of control/regulation signals (S/R) derived from the real-time motion planning, wherein the flight control/regulation apparatuses (25) of the aircraft (1) are actuatable such that the aircraft (1) is moved either a) along the reference trajectory (RT), or b) along a real-time trajectory within one of the confidence intervals (3.1-3.5) or along the emergency trajectory with a given or required deviation from the reference trajectory (RT).

19. The system (10) as claimed in claim 18, wherein the motion preliminary planning unit (11) is an embedded system or a user PC, and, in the case of a computer (11) external to the aircraft (1), said parameters of a pre-planned mission (17) are transferable to the aircraft (1).

20. The system (10) as claimed in claim 19, further comprising a state machine (22) on board the aircraft (1) that includes an algorithm and that triggers different system behaviour depending on system data of the aircraft (1) recorded by the sensors, and the state machine (22) is executable on board the aircraft (1) and during the flight.

21. The system (10) as claimed in claim 20, wherein the real-time control unit (18) is configured on a computer located on board the aircraft (1), on which an algorithm (18a) for real-time motion planning of the aircraft (1) is set up and executable.

22. The system (10) as claimed in claim 21, wherein the real-time control unit (18) is configured to interact with the database (19) and the state machine (22) in order to calculate an actual flight path based on the stored parameters and the system behaviour triggered by the state machine (22) and to output corresponding control/regulation signals (S/R) to the flight control/regulation apparatuses (24, 25) of the aircraft (1).

23. The system (10) as claimed in claim 22, wherein the motion preliminary planning unit (11) and a preliminary planning algorithm executed thereon has inputs for map material and corresponding map data (15) in the form of distributed map formats and for inputting start and destination coordinates (16), and outputs for parameterized or non-parameterized trajectories, and confidence intervals.

24. The system (10) as claimed in claim 23, wherein the database (19) located on board the aircraft (1) contains:
    map material (15) of the mission;
    said parameters from the preliminary planning (17), including the trajectories (RT) and the confidence intervals (3.1-3.5);
    maneuver libraries (20); and
    prioritization protocols (21).

25. The system (10) as claimed in claim 24, wherein the computer (18) located on board the aircraft (1) and a path planning algorithm (18*a*) executed thereon has inputs for
    1) a state vector consisting of a state determination based on sensor data fusion of data from different sensors of the aircraft (1), from which the state vector is able to be estimated by way of a model prediction;
    2) parameters from the database (19);
    3) the maneuver libraries (20) from the database (19);
    4) a signal relating to the system behaviour from the state machine (22);
    5) the prioritization protocols (21) from the database (19);

and an output for a path vector $(p, \dot{p}, \ddot{p}, \dddot{p}, \psi, \dot{\psi}, \ddot{\psi})$ to at least one of the regulation or the actuation apparatus (24, 25), including a path vector with a position specification p and the time derivatives thereof and the yaw angle $\psi$ and the time derivatives thereof.

26. An aircraft (1) including the system as claimed in claim 18, comprising:
    the motion preliminary planning unit (11);
    the storage unit with the database (19);
    the real-time control unit (18);
    the actuation apparatus (23); and
    a system monitor that is configured to record and to provide available data about the aircraft.

* * * * *